(12) United States Patent
Poggi

(10) Patent No.: US 10,286,243 B2
(45) Date of Patent: May 14, 2019

(54) METHOD AND SYSTEM FOR NEUTRALIZING ASBESTOS

(71) Applicant: Paul Poggi, Corte (FR)

(72) Inventor: Paul Poggi, Corte (FR)

( * ) Notice: Subject to any disclaimer, the term of this patent is extended or adjusted under 35 U.S.C. 154(b) by 0 days.

(21) Appl. No.: 15/513,449

(22) PCT Filed: Sep. 22, 2015

(86) PCT No.: PCT/FR2015/052542
§ 371 (c)(1),
(2) Date: Mar. 27, 2017

(87) PCT Pub. No.: WO2016/046493
PCT Pub. Date: Mar. 31, 2016

(65) Prior Publication Data
US 2017/0304666 A1 Oct. 26, 2017

(30) Foreign Application Priority Data

Sep. 22, 2014 (FR) ........................................ 1458915

(51) Int. Cl.
*A62D 3/36* (2007.01)
*C22B 3/06* (2006.01)
(Continued)

(52) U.S. Cl.
CPC .................. *A62D 3/36* (2013.01); *B09B 3/00* (2013.01); *B09B 3/0066* (2013.01); *C01B 33/20* (2013.01);
(Continued)

(58) Field of Classification Search
None
See application file for complete search history.

(56) References Cited

U.S. PATENT DOCUMENTS 4,783,129 A * 11/1988 Jacobson .............. B08B 15/026
312/1
5,096,692 A * 3/1992 Ek ............................ A62D 3/36
423/167.1
(Continued)

FOREIGN PATENT DOCUMENTS

JP 2000271561 * 10/2000
JP 2010009276 * 1/2010
(Continued)

OTHER PUBLICATIONS

Gregson, NIcky "inextinguishable fibres . . . " Envir and Planning A, vol. 42, 1065-1083 (Year: 2010).*

*Primary Examiner* — Sheng H Davis
(74) *Attorney, Agent, or Firm* — Patshegen IP LLC; Moshe Pinchas

(57) ABSTRACT

The invention relates to a system for neutralizing asbestos, said system comprising a mobile neutralization unit (200) comprising:
 an asbestos waste sorting module (225),
 an asbestos grinder (255) and
 a hot acid bath (250) for rendering asbestos inert.
Preferably, the asbestos waste sorting module comprises:
 a window with glove boxes; and
 a conveyor for transporting the asbestos waste in front of the window.
In embodiments, the system comprises a means for containing the atmosphere within the mobile neutralization unit and/or the hot acid bath (250) of the mobile neutralization unit (200) comprises sulfuric acid.

17 Claims, 6 Drawing Sheets

Figure 1:
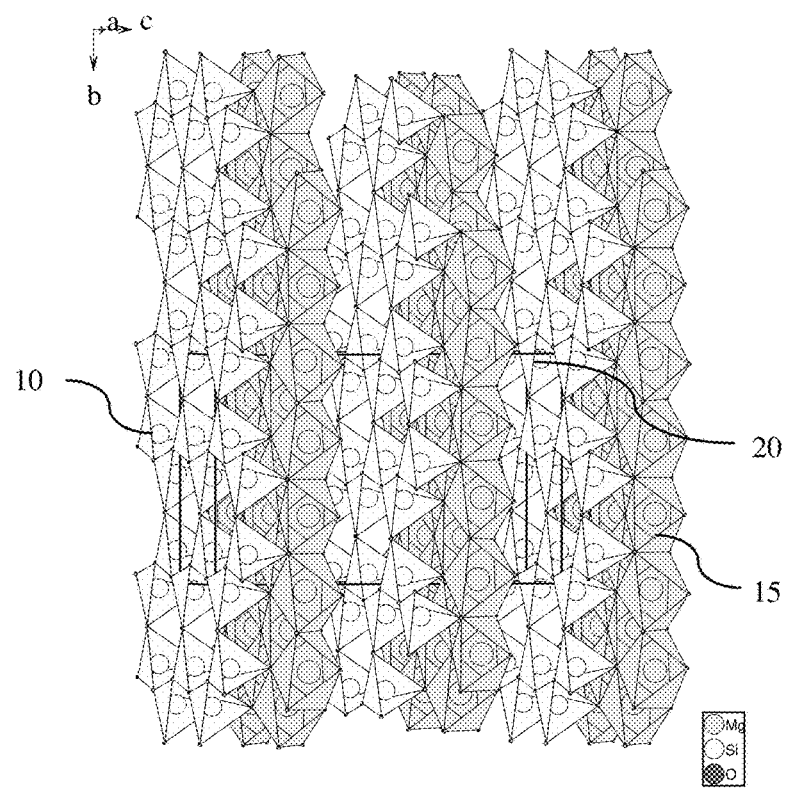

(51) Int. Cl.
   *B09B 3/00* (2006.01)
   *C04B 14/40* (2006.01)
   *C22B 1/00* (2006.01)
   *C22B 7/00* (2006.01)
   *C01B 33/20* (2006.01)
   *C04B 18/04* (2006.01)
   *A62D 101/41* (2007.01)
   *C01B 39/00* (2006.01)

(52) U.S. Cl.
   CPC ............ *C04B 14/40* (2013.01); *C04B 14/405* (2013.01); *C04B 18/04* (2013.01); *C04B 18/0463* (2013.01); *C22B 1/005* (2013.01); *C22B 3/06* (2013.01); *C22B 7/007* (2013.01); *A62D 2101/41* (2013.01); *C01B 39/00* (2013.01); *Y02P 10/234* (2015.11)

(56) References Cited

U.S. PATENT DOCUMENTS

| | | | | |
|---|---|---|---|---|
| 5,258,562 A | * | 11/1993 | Mirick | A62D 3/35 423/167.1 |
| 5,552,039 A | * | 9/1996 | McBrayer, Jr. | B01J 3/042 210/177 |
| 6,149,017 A | * | 11/2000 | Manka | B07B 13/00 209/630 |
| 6,325,753 B1 | * | 12/2001 | Rodriguez | B09B 3/0041 210/241 |
| 6,391,271 B1 | * | 5/2002 | Debailleul | A62D 3/36 423/167.1 |
| 2005/0096495 A1 | * | 5/2005 | Mason | A62D 3/33 588/252 |
| 2006/0149118 A1 | * | 7/2006 | Sigon | A62D 3/20 588/312 |
| 2009/0118563 A1 | * | 5/2009 | Timmons | B09B 3/0066 588/314 |
| 2010/0234667 A1 | * | 9/2010 | Servida | A62D 3/20 588/312 |
| 2012/0304535 A1 | * | 12/2012 | Bai | C10L 5/06 44/589 |

FOREIGN PATENT DOCUMENTS

| | | | |
|---|---|---|---|
| JP | 2012101209 | * | 5/2012 |
| WO | 2008093368 | * | 8/2008 |

* cited by examiner

METHOD AND SYSTEM FOR NEUTRALIZING ASBESTOS

FIELD OF THE INVENTION

The invention concerns a method and system for neutralizing and recycling asbestos. It is particularly applicable for neutralization of asbestos in asbestos removal projects.

STATE OF THE PRIOR ART

Asbestos is not a mineral in itself. It is a generic term which designates a group of naturally metamorphic rocks, of fibrous morphology. The term "asbestos" has been adopted for purposes of commercial identification.

'Asbestos' can be divided into two major mineral subdivisions:
the 'serpentines', of which there is one single variety—Chrysotile, and
the 'amphiboles', which break down into five varieties, Amosite, Crocidolite, Actinolite, Anthophyllite and Tremolite.

Three varieties are available commercially:
chrysotile (white asbestos), chemical formula $Mg_3Si_2O_5(OH)_4$,
crocidolite (blue asbestos), chemical formula $Na_2(Mg,Fe)_3Al_2Si_8O_{22}(OH)_2$ and—
amosite (brown asbestos), chemical formula $(Mg,Fe), Si_8O_{22}(OH)_2$ The Chrysotile variety represents more than 95% of the asbestos produced and consumed between 1900 and 2003.

Asbestos is a material which possesses several advantages:
interesting physico-chemical properties such as thermal, mechanical and chemical resistance.
a low selling price due to economic production costs.

It is for this reason that asbestos is used in more than 3000 products notably in the domain of construction materials. It is particularly to be found in:
flocking,
false ceilings,
floor coverings
insulation lagging, cladding,
packaging,
seals,
wall and ceiling coverings,
roofs and facades,
ventilation and water ducts.

There are three major types of waste containing asbestos:
airborne waste, originating from flocking and cladding or lagging, and from the material degradation of which the fibers can be released into the atmosphere.
Asbestos waste or asbestos-cement which is not susceptible to disintegration and release of fibers,
other asbestos waste such as brake linings and other products.

On disintegration, asbestos releases microscopic fibers which remain in suspension in the air and which when they are inhaled can be absorbed into the pulmonary cavities.

Research carried out on asbestos has demonstrated that the risks associated with its use exist predominantly when the asbestos takes the form of inhalable particles, notably in the guise of loose acicular fibers, the inhalation of which is susceptible to result in fibrous or cancerous formations notably in the human body giving rise to the appearance of illnesses such as lung cancer or asbestosis. Pathologies of this type have been attributed to the acicular form of asbestos fibers but equally to the effect of liberated ions on living tissues following partial dissolution of asbestos.

This can lead to the appearance of several illnesses:
asbestosis, a pulmonary infection analogous to the silicosis of miners, benign lesions of the pleurae,
lung cancer (increased risk where association with tobacco) and
mesotheliomas, rare but grave cancers of the pleurae and peritoneum.

On account of these risks, waste containing asbestos is considered as dangerous industrial waste, and research has been conducted in recent years to develop techniques which would promote its confinement or its efficient elimination. It is to be noted on this subject that there exist numerous waste materials of this type which are essentially flocked asbestos from lagging material or asbestos-cement which were commonly employed, notably in France, for example in the domain of buildings and public works, up to 1997 when its fabrication, and the use of products containing asbestos fibers, was banned.

A diagnosis of the presence of asbestos is imposed by law for all works subject to an authorization for demolition or for the transformation of buildings constructed before 1 Jan. 1991. The elements containing asbestos must be removed and eliminated according to the appropriate regulations.

Two procedures for the elimination of asbestos waste are recognized as of the present: landfill and vitrification.

The first solution adopted for the management of waste containing asbestos consists in the placing of asbestos based waste in storage centers for dangerous waste. This confinement is hardly satisfactory as a solution, notably from the point of view that there is no treatment capable of rendering the waste inoffensive and leads to an accumulation of dangerous waste on a sensitive site. Additionally, the capacity for storage in these centers is not limitless and the costs are not inconsiderable. Further, the producer of the waste remains liable in terms of responsibility for as long as the asbestos exists, so forever.

The handling/storage charges of the waste are relatively expensive at a cost of about 900 € per ton (transport excluded).

Another solution currently employed consists in the vitrification of the asbestos based waste achieved by heating, typically by aid of a plasma torch, the waste to a high temperature. The vitrification of the asbestos proves certainly to be an efficient technique for treatment of asbestos as it leads to a conversion of all types of asbestos into a vitrified material which is not susceptible to the liberation of inhalable fibers from acicular asbestos. There is nevertheless a major inconvenience for this method of vitrification which is the very high cost due to a very substantial energy consumption related to the deployment of the plasma torch as well as the installation and maintenance costs implied by highly technological apparatus. The deployment cost of the vitrification process is of the order of 1350 to 3000 € per ton (net of applied taxes and excluding transport).

Further, the asbestos vitrification process has a relatively reduced capacity (22 tons per day for the only installation of this type existing in Europe,—(8000 tons per year), which is very low by comparison to the very high quantities of asbestos-based waste which currently require treatment. By way of indication, the annual quantity in France, of waste containing asbestos is of the order of 200,000 tons of flocked asbestos and 20 million tons of asbestos cement. Actually in France, there are approximately 100 million $m^2$ of buildings which are still with asbestos.

Solutions other than landfill and vitrification have been envisaged for the treatment of asbestos based waste, but which were revealed to be either non applicable in practice or less efficient than vitrification.

There was also for example a proposal to destroy the acicular structure of the asbestos fibers by subjecting the fibers to an intensive grinding with the objective to induce an amorphization of the asbestos.

Furthermore, it was proposed to perform an acid attack on the asbestos with the objective to make the acicular fibers soluble. Within this framework, a radical method consisted in subjecting the asbestos to attack by concentrated hydrofluoric acid. The results proved to be very positive but the test could only be envisaged in a laboratory environment as effectively the toxicity and the associated risks related to use of hydrofluoric acid would proscribe its employment on an industrial scale.

The use of acids other than the above mentioned hydrofluoric acid has been proposed but an attack by these alternative acids proved largely to be ineffective in the treatment of most types of asbestos. There is described for example in the document WO 97/27902 a treatment for the dissolution of asbestos by hydrochloric acid with added potassium ions and possibly by other acids, at temperatures in a range from 30 to 95°. The procedure described in this document could certainly prove to be effective with certain types of asbestos, notably the chrysotile type of asbestos but in a majority of cases proved to be unsuited for the treatment of the amphibole type of asbestos (notably the cummingtonites (especially the amosites) and the crocidolites), and particularly where concerning flocked asbestos. Numerous publications have established in fact that the effect of acid attacks on asbestos remains as a general rule limited to the surface of the acicular fibers of the asbestos, in particular where the amphibole type of asbestos is concerned. This would seem to be evident by the formation of a gel on the surface which prevents attack penetration to the core of the asbestos fibers. For further details on this subject, please refer to the article "*Dissolution of fibrous silicates in acid and buffered salt solutions*", Allen M P. and Smith R. W., Minerals Engineering, vol. 7, 1527-1537 (1994).

Other solutions envisage a procedure for treatment of a waste containing asbestos including the dissolution of the asbestos contained in the waste, by making the waste react with an acid other than hydrofluoric acid at a temperature of at least 125° and at a pressure superior to 0.2 MPa (ie; at a pressure of at least 2 bar), and wherein:

The asbestos contained in the treated waste is of the amphibole type;

The solution obtained as a result of the dissolution by acid of the asbestos is developed.

Where the valorization of by-products is concerned, the only possibility is the transformation of the asbestos into « glaze », a reusable material for buildings and public works (as sub-strata in roadworks) and sold at 10 € per ton (net of tax and excluding transport).

OBJECT OF THE INVENTION

The presented invention is intended to remedy all or part of the above inconveniences.

To this effect, according to its first aspect, the presented invention relates to a system for neutralization of asbestos that comprises a mobile neutralization unit comprising:

an asbestos waste sorting module,
an asbestos grinder
a hot acid bath for rendering the asbestos inert.

This mobile approach presents not only a solution for the amorphization of the asbestos but also for the reduction of costs as avoiding its disposal into a specific storage depot and the transport of the asbestos, since the asbestos is no longer existing. For information the transport and the storage of dangerous material such as asbestos are subject to strict and complex regulations which render its disposal very expensive.

In embodiments, the asbestos waste sorting module comprises:

a window with glove boxes and
a conveyor for transporting the asbestos waste in front of the window As a result of these arrangements the operators in charge of the sorting do not require either to wear special clothing or to follow a complex procedure to gain entry to a dangerous atmosphere.

In embodiments, the system object of the presented invention comprises a means of confinement of the atmosphere in the mobile neutralization unit.

As a result of these arrangements it is possible to reduce, eliminate even, the risk of asbestos particles escaping from the mobile unit.

In embodiments, the hot acid bath of the mobile neutralization unit consists of sulfuric acid.

Sulfuric acid has the advantage of presenting a reduced cost of return and to react with all types of commercial asbestos.

In embodiments, the hot acid is transported in the hot acid bath of the mobile neutralization unit at a temperature comprised between 70° C. and 100° C.

In embodiments, the hot acid is transported in the hot acid bath of the mobile neutralization unit at a temperature comprised between 80° C. et 100° C.

As a result of each of these arrangements the chemical reaction is rapid and effective.

In embodiments, the system, object of the present invention, comprises a vehicle trailer forming a support to the mobile neutralization unit.

As a result of these arrangements, the deployment of the mobile unit on site is facilitated, the movement of the mobile neutralization unit being possible on the road network.

It is to be noted that the trailer is preferably equipped with a technical bay which would not only allow to make the apparatus operable in accordance with the regulated safety conditions in force, but also to monitor/verify/operate/register the global functional parameters of the mobile neutralization unit in order to be capable of responding at all times to a sanitary inspection and to execute maintenance or repair operations.

In embodiments, the system, object of the present invention, comprises a boat forming a support to the mobile neutralization unit.

As a result of these arrangements the asbestos removal from a ship is facilitated, the boat carrying the mobile neutralization unit being capable of taking up position in proximity to or to berth alongside the ship being the subject of the asbestos removal.

In embodiments, the system object of the present invention comprises a vehicle equipped with a motor, the hot acid bath being heated by the motor of the vehicle.

As a result of these arrangements, the mobile unit itself does not have a motor and is therefore simpler and less costly.

In embodiments, the system object of the present invention comprises a generator, the hot acid bath being heated by means of electrical heating supplied by the generator.

As a result of these arrangements, a vehicle carrying the mobile unit can supply the electricity to the mobile unit.

In embodiments, the mobile unit can be housed in a standard 40-foot long container.

As a result of these arrangements, the mobile unit can easily be transported by truck, train, ship or plane.

In embodiments, the mobile neutralization unit further comprises:
- a tank for fresh water;
- a tank for used water;
- a decontamination chamber for the operator;
- a chamber for the introduction of asbestos based waste and
- an evacuation channel for sorted non-asbestos waste.

The freshwater and used water tanks allow for the entirety of the asbestos-based waste to be treated by means of moisture, by addition of clear water in order to on the one hand limit the amount of dust in suspension and on the other to fluidify the circulation of waste.

In embodiments, the asbestos waste sorting module comprises:
- a workbench,
- a conveyor belt and
- a metal detection unit.

Resulting from these arrangements, an efficient sorting is performed, while at the same time reducing the effort required on the part of the sorting operator. What is more, metals which could pollute the acid bath are detected and withdrawn before introduction of the asbestos waste in the hot acid bath.

In embodiments, the hot acid bath is contained in an insulated tank which can be dismounted from the mobile neutralization unit.

As a result of these arrangements the stocking of the mobile unit is simplified and the continuity of its deployment can be ensured by complete replacement of the tank.

In this way the acid can be replaced as often as required, and the residue from the asbestos neutralization can be removed. Preferably the clean water reserves can be replenished and the used water evacuated simultaneously with the changing of the acid bath.

In this approach for asbestos waste treatment, the mobile units remain deployed on the site during the entire Site operation and are simply supplied with "new" tanks of fresh water and acid and the used tanks are recuperated and transported on "standard" trucks to a treatment plant.

In embodiments, the system, object of the present invention, comprises a supply vehicle comprising:
- a means for the dismounting of a tank from the mobile neutralization unit containing the used bath acid.
- a means for the loading of a tank of pre-heated acid into the mobile neutralization unit,
- a means of emptying a tank of used water or the exchange of a tank of used water with an empty tank.
- a means of refilling a tank of fresh water or exchange with a tank of fresh water.

As a result of these arrangements the restocking of the mobile unit is simplified and the continuity of its deployment can be ensured by complete replacement of the tank.

This vehicle participates in the approach for the treatment of asbestos waste wherein the mobile units remain deployed on the Site for the duration of the works and are simply restocked in consumables, fresh water and new acid, and the used water and used acid are recuperated and transported on "standard" trucks to a treatment plant.

In embodiments, the system, the object of the present invention, comprises a fixed supply unit comprising:
- a means for the dismounting of a tank from the mobile neutralization unit and which contains the used acid bath.
- a means of loading a tank of preheated acid into the mobile neutralization unit
- a means of emptying a tank of used water or exchange of a tank of used water with an empty tank.
- a means of refilling a tank with fresh water or its exchange with a tank of fresh water and
- a means of transferring functional data of the mobile neutralization unit from the said mobile unit to a secured database of the fixed unit.

As a result of these arrangements the restocking of the mobile unit is facilitated by the return of the mobile unit to the fixed unit and complete replacement of the tank.

In embodiments, the fixed supply unit comprises an acid bath microwave heating unit.

As a result of these arrangements the electrical consumption of the mobile unit is reduced.

In embodiments, the system, object of the present invention comprises a means of extraction of magnesium from a liquid fraction formed from the used bath acid.

As a result of these arrangements the value of the magnesium is recovered.

In embodiments, the bath acid is comprised of sulfuric acid, the system object of the present invention comprising a means of production of anhydrite from solid products issued from the reaction taking place in the hot acid bath.

In embodiments, the system, object of the present invention, comprises a means of production of materials presenting mesopores of which at least 10% present a diameter inferior to 20 Å.

As a result of each of these arrangements the solid fraction from the reaction in the bath acid provides a valuable material.

In embodiments, the bath acid is comprised of sulfuric acid which in turn comprises a means of production of magnesium sulfate from the solid products from the reaction taking place in the hot acid bath.

In this way recovery is achieved of valuable magnesium contained in the liquid fraction from the acid attack, obtained after treatment of the asbestos waste. In effect the liquid part contains the quasi-totality of the (dissolved) magnesium which constituted the asbestos.

Having the lowest density of all the metal elements, magnesium possesses characteristics very similar to those of aluminum but it is 34% lighter than aluminum and 70% lighter than steel. It is therefore considered as the ideal solution in response to requirements for lightness by the new transport industry standards.

In addition to its excellent properties in terms of density/resistance to traction, magnesium offers other interesting characteristics:

Taking account of its crystalline structure, magnesium possesses an excellent capacity in reduced vibration transmission (magnesium is 16 times more resistant to impact than aluminum).

Magnesium possesses excellent properties in electromagnetic protection. A screen of one millimeter thickness reduces electromagnetic transmission by 80%. Also, magnesium has a less aggressive effect than aluminum on steel molds, thus permitting to prolong the useful life of tools.

In embodiments, the system, object of the present invention comprises a means of fabrication of zeolites from solid fraction issued from the used bath acid.

During the acid attack, the acid reacts with hydroxylic compounds (OH)— and brucite fibers $Mg(OH)_2$ which results in their disappearance (dissolution of Mg) and therefore the amorphization of asbestos waste which transforms into an inert solid made up of amorphous silica.

The inert solid matter obtained is beneficially exploited in the fabrication of functional material such as zeolites.

Zeolite is a natural mineral (volcanic rock) belonging to the hydrated aluminosilicates group. The zeolites are crystallized microporous solids of which the tridimensional mineral structure is made up of canals and cavities (pores) in communication with the outside environment and of which the diameter is inferior to 2 nm (ie; $2.10^{-9}$ m).

Globally these features confer on the zeolites very interesting properties in different industrial domains such as adsorption, catalysis or ionic exchange.

According to a second aspect, the present invention relates to a process for asbestos neutralization, that comprises:
a step for the installation on the asbestos removal site of
a mobile neutralization unit comprising:
an asbestos waste sorting module
an asbestos grinder
a hot acid bath to render the asbestos inert;
a step for the sorting of asbestos waste in the sorting module of the mobile neutralization unit;
a step for the grinding of asbestos by the grinder of the mobile neutralization unit;
a step for the attack on the asbestos with the hot acid from the hot acid bath of the mobile neutralization unit, and
a step for the extraction of magnesium from the liquid fraction issued from the attack on the asbestos with the hot acid and/or the fabrication of zeolites from the solid fraction from the attack on the asbestos with hot acid.

The advantages, objectives and particular features of this process being similar to those of the system object of this invention, it is not necessary to list them here.

In embodiments, during the step for the sorting of the asbestos waste, the fibrocement waste is also sorted.

As a result of these arrangements, material presenting appreciable mechanical qualities is obtained.

BRIEF DESCRIPTION OF THE DIAGRAMS

Figure 2:
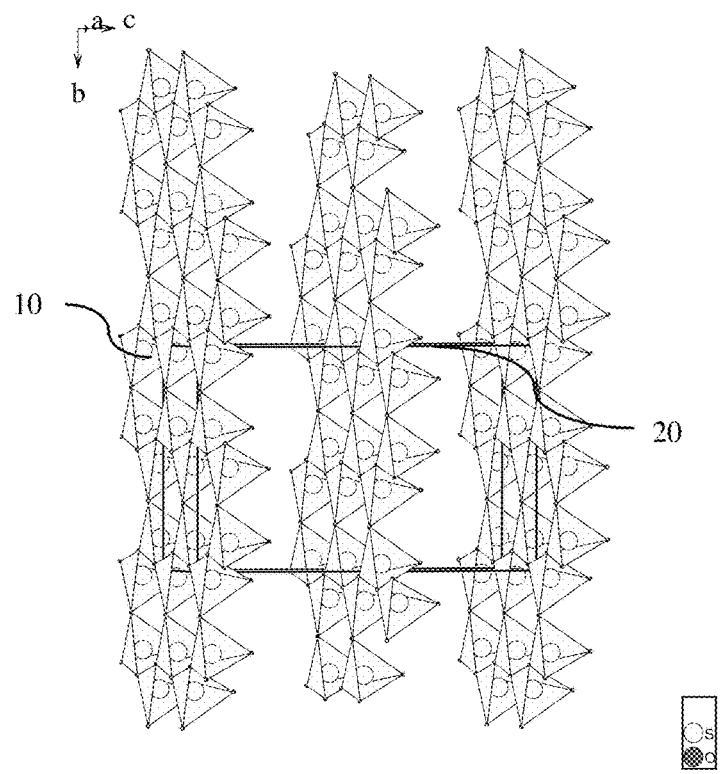
Figure 3:
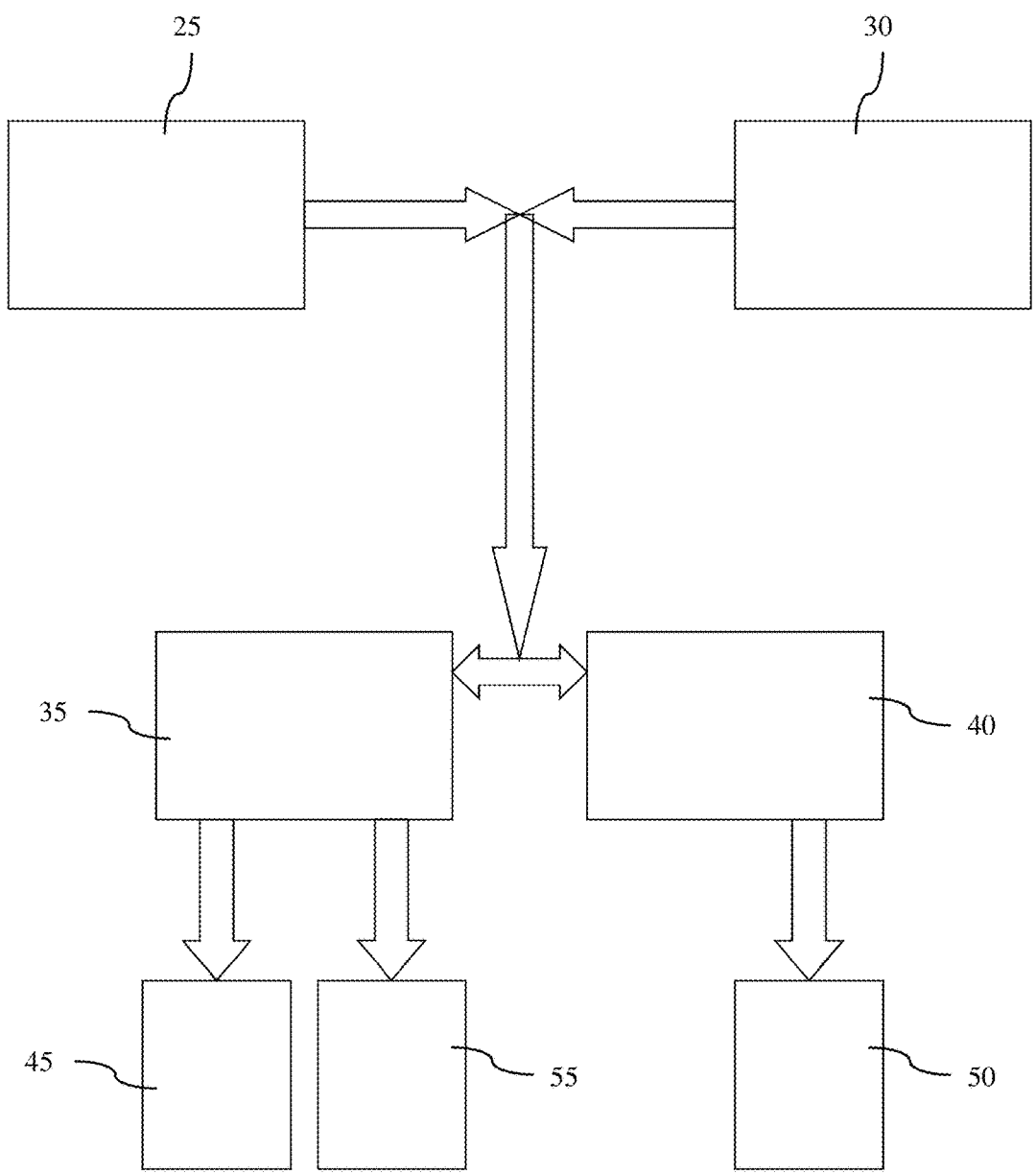
Figure 4:
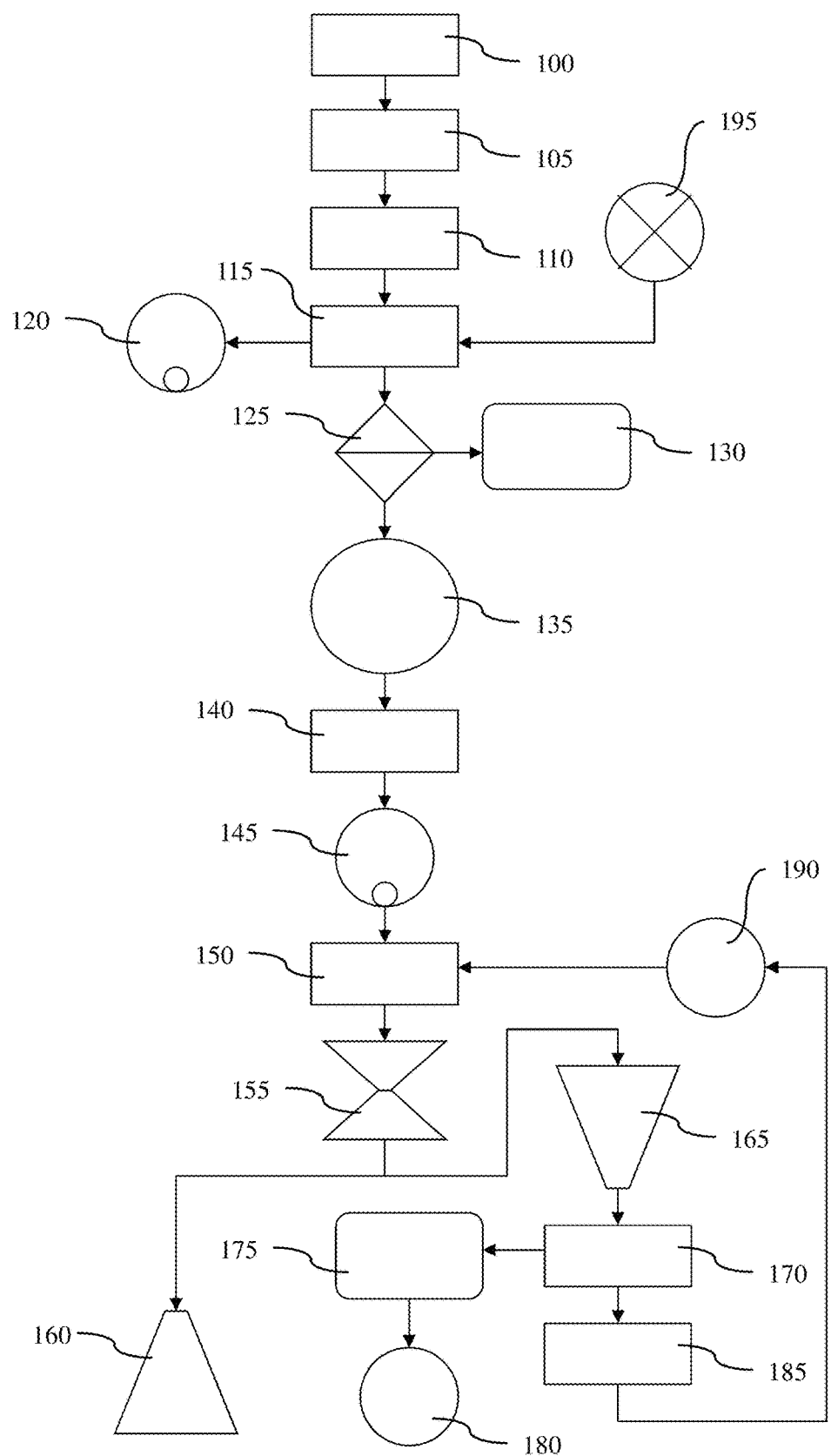
Figure 5:
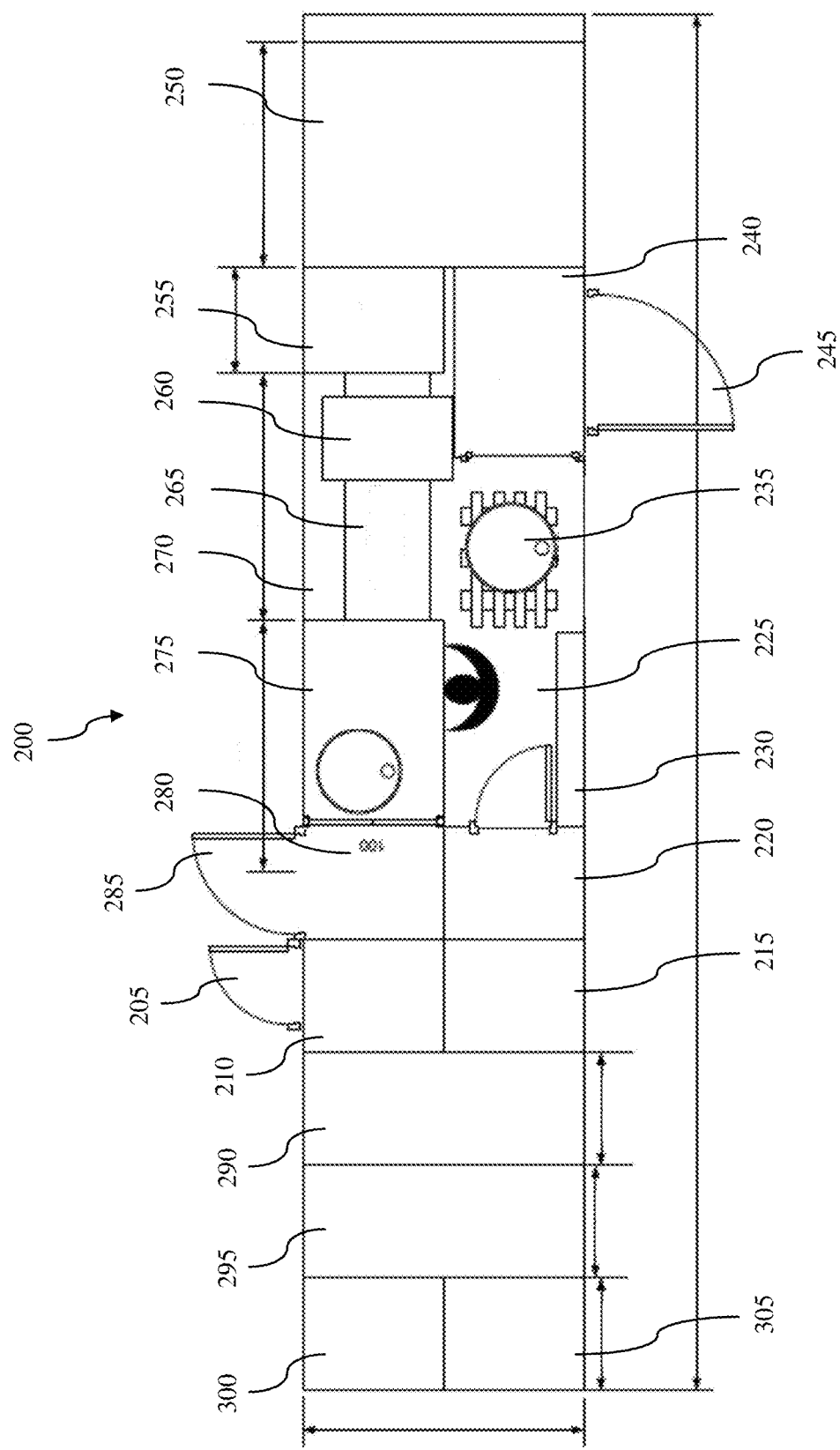
Figure 6:
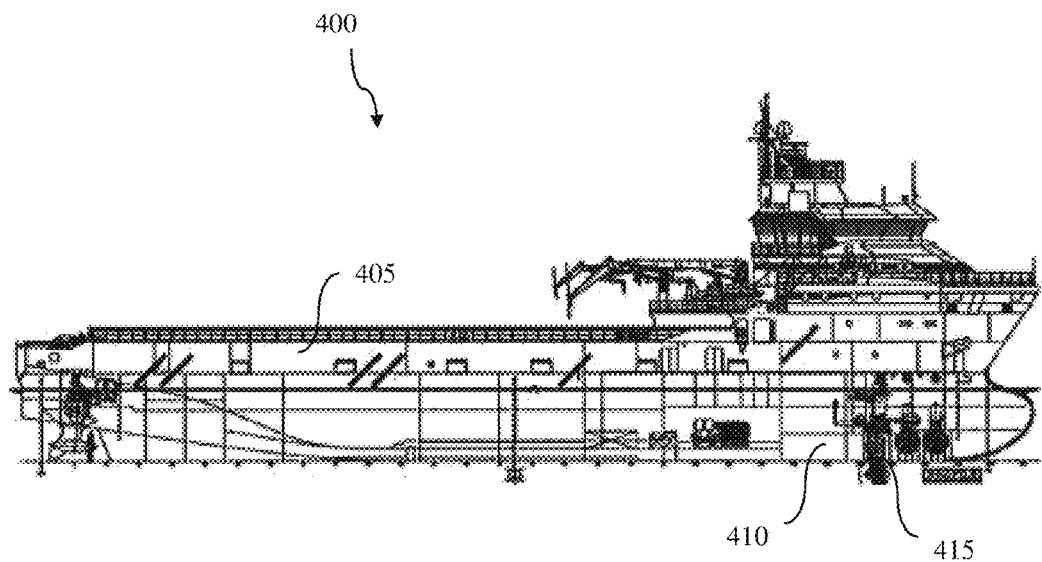
Figure 7:
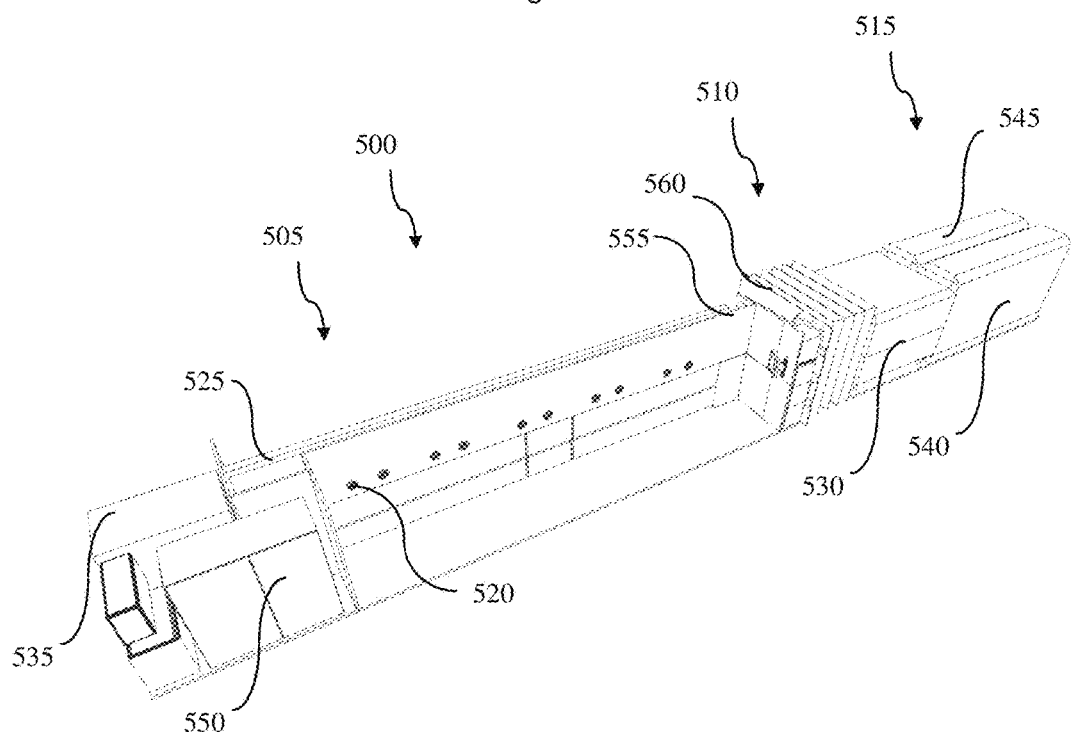
Figure 8:
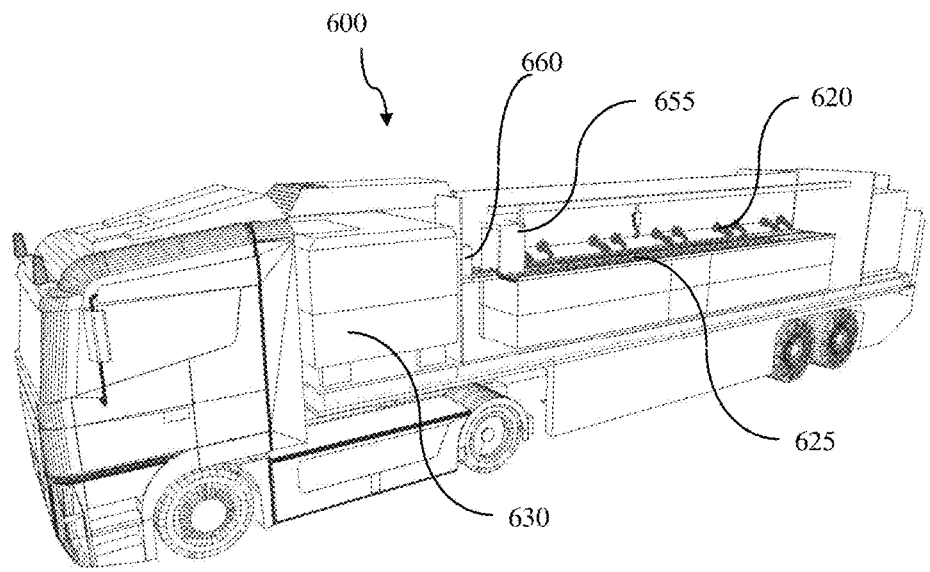
Figure 9:
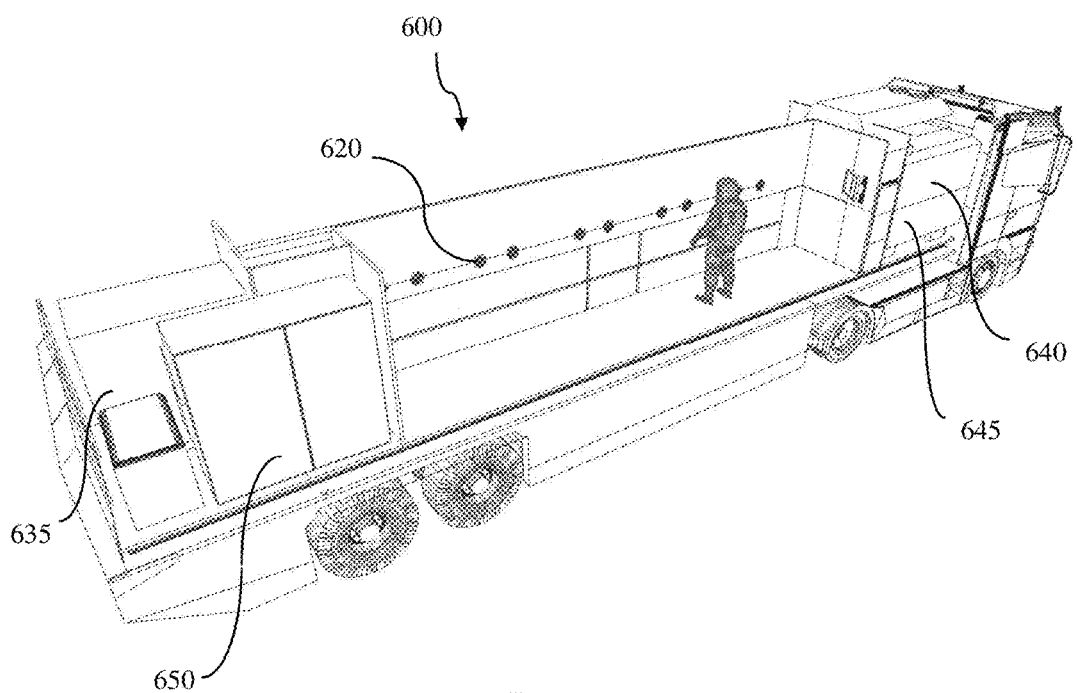

Other advantages, objectives and characteristics of the present invention will become apparent from the description which follows, given with the intention to be explicative and not at all limitative, with regard to the attached diagrams in which:

FIG. 1 represents schematically an asbestos structure before treatment,

FIG. 2 represents schematically the asbestos structure illustrated in FIG. 1 after treatment by acid attack, FIG. 3 represents, in the form of a functional diagram, the process being the object of the present invention, FIG. 4 represents, in the form of an operational plan, a first embodiment of an asbestos treatment unit, FIG. 5 represents, as viewed from above, a first embodiment of a mobile neutralization unit, FIG. 6 represents, as viewed laterally, a boat equipped with a mobile neutralization unit, object of the present invention, FIG. 7 is a view in 3-dimensional effect, of a second embodiment of a mobile neutralization unit, FIG. 8 is a first view in 3-dimensional effect of a truck equipped with a third embodiment of a mobile asbestos neutralization unit and FIG. 9 is a second view in 3-dimensional effect of the truck illustrated in FIG. 8.

DESCRIPTION OF EXAMPLES OF THE EMBODIMENTS OF THE INVENTION

It is to be noted that for the present the diagrams are not drawn to scale.

The present invention concerns a neutralization system, that comprises a mobile neutralization unit and in the embodiments, a supply unit, fixed or mobile, of the mobile neutralization unit and/or a treatment unit for the products issued from the mobile neutralization unit.

The mobile neutralization unit uses an approach comprising amorphization of the asbestos, (regardless of the type, amphibole or serpentine) in a reduced time (less than 24 hours in every case) by immersing the asbestos in an acid bath at temperatures inferior to 104° C., preferably inferior to 100° C., preferably superior to 70° C. and, still more preferred if superior to 80° C.

Each mobile neutralization unit is installed on the asbestos removal site or in proximity to the site, notably where it concerns a ship for asbestos removal, in order to:
sort the asbestos waste
grind the waste and
render the asbestos inert in a hot acid bath.

The acid used should by preference be sulfuric acid, which permits a better return value for the products issued from the reaction.

From the crystallographic point of view, as illustrated in FIG. 1 the chrysotile is presented in the form of stacked layers of silicates 10 (tridymite structure) connected by liaisons 20, and layers of brucite $Mg(OH)_2$ 15.

During the acid attack, the acid reacts with the hydroxylic compounds (OH)— layers of brucite $Mg(OH)_2$ 15 which lead to their disappearance (dissolution of Mg) and therefore the amorphization of the asbestos waste which transforms into an inert solid constituted from amorphous silica. As illustrated in FIG. 2 the residual solid fraction comprises only the amorphous silica 10 and the liaisons 20.

The transport and the stocking of dangerous material like asbestos are subject to strict and complex regulations which render the whole operation very costly. The new mobile approach allows therefore not only to introduce a solution for the amorphization of the asbestos but also to reduce the costs (no further transport of asbestos as the asbestos has ceased to exist, and similarly no need for its storage either.)

The whole is constituted by a mobile neutralization unit and in embodiments:
A trailer, preferably of about twelve meters in length, in compliance with the regulations in force for non-exceptional convoys, which would support the mobile neutralization unit during its transport and equally during its operations,
A truck ensuring the same functions,
A boat, for transport and/or for support during the functioning of the mobile unit or
A fixed site-based support.

The mobile neutralization unit can conveniently be housed in a standard 40-foot container. This would allow the loading of the mobile neutralization unit onto a trailer, onto a train, a ship, or even onto a plane.

As illustrated in FIG. 3, the process object of the present invention comprises to make a reaction of the acid 25 with the asbestos waste 30, to produce an inert solid phase 35 composed of silica and a liquid phase comprising magnesium 40, for example magnesium salts. According to embodiments, the solid phase 35 is treated to supply zeolites 45 and/or anhydrites 55 and/or the liquid phase 40 is treated to extract magnesium or a magnesium compound 50.

As illustrated in FIG. 4, the process comprises:
- A step 100 for the installation on or in proximity to the asbestos removal site, of a mobile neutralization unit, (for example as described in the other diagrams),
- A step for the arrival of the waste 105,
- A step for the weighing of the waste 110,
- A step 115 for the opening and emptying of the waste sacks and the addition of water from a reservoir 195 to reduce the risk of airborne pollution,
- A step for the stocking of polluted sacks 120,
- A step for sorting by visual means and with aid of a metal detector 125,
- A step for the stocking of sterile waste or comprising metal 130,
- A step for the stocking of sorted asbestos 135,
- A step for the grinding of asbestos 140,
- A step 145 for the stocking of ground down asbestos,
- A step 150 for the reaction, in a bath, of ground asbestos and acid supplied from a reservoir 190; in this way the asbestos waste is chemically, economically, and easily neutralized, particularly in the case of attacking the waste with inexpensive sulfuric acid $H_2SO_4$ (for example of 96% purity).
- A step for filtration from the used bath 155,
- A step 160 for extraction of solid fraction from the used bath, with eventual valorization in the form of zeolites,
- A step 165 for extraction of liquid fraction from the used bath.
- A step 170 for precipitation of magnesium compounds and eventually for acid neutralization,
- A step for concentration of magnesium compounds 175,
- A step for stocking magnesium compounds 180 and
- A step for recycling of the used bath 185 to supply the acid reservoir 190.

It is to be noted that the valorization of the solid phase is not described in FIG. 4.

The mobile neutralization unit 200 illustrated in FIG. 5 comprises:
- An operators' entry door 205 towards a cloakroom 210,
- A shower 215,
- A cloakroom for working attire 220,
- A module, or workshop, for sorting 225,
- A detachable acid bath tank 250,
- A chamber for introduction of asbestos waste sacks 280 equipped with an exterior door 285,
- A tank for used water 290,
- A tank for fresh water 295,
- A generator 300 and
- An air compressor 305 equipped with a compressed air reservoir.

The cloakroom 210, the shower 215 and the cloakroom 220 constitute jointly a decontamination chamber for the operator;

The module 225 for the sorting of waste comprises:
- A workbench 275,
- A conveyor belt 265,
- A metal detection unit 260,
- The grinder 255,
- A tool cupboard 230,
- A receptacle for sorted non-asbestos waste 235 (after sorting) and
- An evacuation chamber 240 for non-asbestos waste, and equipped with an exterior door 245.

The module 225, or workshop, for sorting, is equipped with a pipe 270 for air circulation keeping the module 225 in depression, thus avoiding the airborne diffusion of asbestos particles outside of the mobile neutralization unit.

A confined atmosphere is therefore retained in the mobile neutralization unit 200.

The whole of the asbestos-based waste is treated by moisture (addition of fresh water—not represented) in order to limit the diffusion of dust in suspension and also to fluidify the circulation of the waste.

After the grinding, the asbestos-based waste is introduced by way of a sealed pipe (not represented) into an insulated tank of hot acid for destruction. This tank is detachable allowing its replacement as and when required. It is the same procedure for the tanks of fresh and used water.

The mobile neutralization unit 200 is also equipped with a technical bay (not represented) allowing not only to operate the whole of the components in conditions of safety compliant with the regulations in force but also to monitor/verify/operate/register the whole of these parameters in order to be able to respond at any time to a sanitary inspection.

As a complement to the mobile units the neutralization system could comprise at least one fixed unit, or factory (not represented), for supply in hot acid tanks. The bringing of a mobile neutralization unit to the fixed unit is achieved by a series of simple actions:
- dismounting of the tank containing the waste.
- loading of a 'new' tank (preheated acid),
- emptying of the used water tank or its exchange with an empty tank,
- refilling of the fresh water tank or its exchange and
- connection to the operating system of the mobile neutralization unit for storage of functional data of the mobile neutralization unit onto a secured and fixed database integral to the factory.

The fixed unit to supply a mobile neutralization unit comprises:
- a means of dismounting a tank from the mobile neutralization unit containing the used acid bath,
- a means of loading a tank of pre-heated acid into the mobile neutralization unit,
- a means of emptying a tank of used water or the exchange of a tank of used water with an empty tank,
- a means of filling a tank with fresh water or its exchange with a tank full of fresh water and
- a means of transfer of the functional data of the mobile neutralization unit from said unit to a secured database in the fixed unit.

Preferably, the fixed unit comprises a means of extraction of magnesium from the liquid fraction issued from the used acid bath.

Preferably, the fixed unit comprises also a means of fabrication of zeolites from the solid fraction issued from the used acid bath.

In embodiments, the fixed unit comprises a microwave heater for the acid bath, the tank being lagged with insulation to conserve the heat.

In other embodiments, the mobile units remain deployed on the site for the duration of the asbestos removal works and are simply restocked with tanks of fresh water and 'new' acid, and the empty tanks are recovered and transported to the treatment plant on 'standard' trucks.

The vehicle (not represented) to supply a mobile neutralization unit comprises:
- a means to dismount a tank from the mobile neutralization unit containing the used acid bath, a means of loading a tank of pre-heated acid into the mobile neutralization unit, a means of emptying a tank of used water or its exchange with an empty tank, a means of filling a tank with fresh water or its exchange with a full tank of fresh water.

The mobile neutralization unit and the supply vehicle resemble from the exterior known refrigerated trailer trucks (curtains closed), trucks or transport boats.

Illustrated in FIG. 6, is a boat based factory comprising a transport boat 400 («supply boat») transporting at least one mobile neutralization unit 405. The boat 400 comprises a motor 415 and a generator 410 mu by the motor 415. The electrical supply for each mobile neutralization unit 405 is made by the generator 410.

It is noted that the boat 400 can carry at the same time at least one mobile neutralization unit 405, the acid replacement tank of the reservoirs of fresh and used water.

In the embodiments illustrated in FIGS. 7 to 9, the operators work in front of a window wearing standard work attire, it not being necessary to wear special protective 'anti-asbestos' clothing.

In FIG. 7 a mobile asbestos neutralization unit 500 comprises:

A sorting tub 505, for example able to be housed in a standard 40-foot container.

An articulation 510, for example with bellows, and

A treatment tub 515, for example housed in a standard 20-foot container.

The glove box positions 520 separated by a window from the conveyor 525 simplify considerably the operations since the operators do not have to pass by the sterile zone (dress, shower, undress . . . ).

The mobile neutralization unit 500 comprises:

A module, or workshop for sorting from the conveyor 525,

A detachable acid bath tank 530,

A reception chamber for the arrival of sacks of asbestos-based waste 535 equipped with an exterior door (not represented), A tank of used water 540, A tank of fresh water 545, An air compressor 550 equipped with a compressed air reservoir, A metal detector unit 555, The grinder 560, A receptacle for the sorted non-asbestos waste (not represented) and An evacuation chamber for non-asbestos waste (not represented) equipped with an exterior door.

It is emphasized here that a glove box is a sealed apparatus permitting manipulations in a particular environment. The gloves, for hands and wrists only, or going up to the elbows or shoulders even, fixed to a sealed screen, allow access to the interior without infringing the confinement. The operator puts his hands in the gloves and is able to observe his manipulations through the transparent screen.

In this way, the mobile neutralization unit avoids the presence of sorting personnel inside the confined zone. The sorting personnel are not therefore subject to the legal constraints concerning work in a dangerous environment and the decontamination chamber can be reduced or even suppressed completely.

In FIGS. 8 and 9, a mobile asbestos neutralization unit 600 comprises glove box positions 620 separated by a window from a conveyor 625, simplifying considerably the operations since the operators do not have to pass through the sterile zone (otherwise requiring dressing, shower, undressing . . . ).

The mobile neutralization unit 600 comprises:

A module, or workshop, for sorting from the conveyor 625,

A detachable tank for acid bath 630,

A reception chamber 635 for introduction of sacks of asbestos-based waste, and equipped with an exterior door (not represented), A tank for used water 640, A tank for fresh water 645, An air compressor 650 equipped with a compressed air reservoir, A metal detector unit 655, The grinder 660, A receptacle for non-asbestos sorted waste (not represented) and An evacuation chamber for non-asbestos waste (not represented) equipped with an exterior door.

The fact to use sulfuric acid instead of hydrochloric acid has two advantages:

it is actually the least expensive acid and is produced industrially on a large scale (no risk of a lack of suppliers)

the liquid phase obtained after acid attack is magnesium sulfate, which is very useful in numerous industries, for example in the composition of agricultural fertilizer.

There follows a description of the valorization possibilities offered by the inert solid obtained after hot acid attack.

Following the hot acid treatment, the inert solid obtained is susceptible for exploitation in different ways of valorization according to the nature of the initial waste from which it is issued.

In effect, the material containing loose asbestos, such as plaited asbestos cords, have a very high rate of asbestos content and permit, (after hot acid attack) to obtain mainly the silica ($SiO_2$) in large quantity and thus promoting the fabrication of zeolites.

The material containing asbestos related substances (10 à 20% asbestos), such as corrugated sheets of fibrocement, have a chemical composition in calcium oxide (lime (CaO) and in silica ($SiO_2$) of 40% and 19% respectively). This composition is very close to that of Portland cement (registered trademark). The attack on these materials by hot sulfuric acid permits to mostly obtain calcium sulfate $CaSO_4$ also called Anhydrite. This compound forms in dominant proportion in mixture with the silica. Anhydrite is an essential additive in the fabrication chain for cement.

It is important to emphasize here the role of sulfuric acid as the determining factor for obtaining Anhydrite as the use of other acids such as hydrochloric acid do not achieve the same result.

In certain cases, the acid attack on the starting waste leads to the formation of an inert solid comprising mesopores (distribution of the pore diameters: 75% macro and mesopores of diameter superior to 20 Å and 25% micro pores of diameter inferior to 20 Å), and generate an increase in area of its specific surface BET. More generally, the present invention permits the production of products presenting mesopores of which at least 10% present a diameter inferior to 20 Å.

These characteristics (macro structure and mesoporous associated to the fibrous morphology) give to the inert solid remarkable mechanical properties, for example permitting the absorption and/or the blocking of a shock wave, for example energetic materials (explosives fabrication) and acoustic insulation by sound absorption barriers.

Other applications are envisaged for the intermediate inert solid, for example in the domain of water filtration, applications in which the granular distribution would be able to provide good bacterial support.

The invention claimed is:

1. A system for asbestos neutralization, the system comprising a mobile housing mounted on a boat said housing including:
    a module for sorting of asbestos waste having a window and a conveyor configured for transporting the asbestos in front of the window, said window is equipped with sealed glove boxes configured to allow manipulation of asbestos waste on the conveyor and remove non-asbestos from the conveyor;
    a first chamber disposed adjacent first end of said conveyor for introduction of asbestos waste;
    an asbestos grinder disposed adjacent a second end of the conveyor and being configured for grinding the asbestos waste from the conveyor;
    an insulated bath of hot acid detachably attached to said mobile housing and having a sealed pipe configured for introducing ground asbestos from said asbestos grinder to said insulated bath; said hot acid being configured to react with said ground asbestos so as to render the ground asbestos inert; and
    a second chamber disposed adjacent said conveyor for evacuating said non-asbestos.

2. A system according to claim 1, that comprises a means of atmospheric containment in the mobile neutralization unit.

3. A system according to claim 1, wherein the bath of hot acid of the mobile neutralization unit comprises sulfuric acid.

4. A system according to claim 1, wherein the hot acid is carried in the hot acid bath of the mobile neutralization unit at a temperature ranging from 70° C. to 100° C.

5. A system according to claim 1, that comprises a vehicle trailer forming a support to the mobile neutralization unit.

6. A system according to claim 1, wherein the mobile neutralization unit comprises in addition:
    a tank for fresh water;
    a tank for used water;
    a decontamination chamber for the operator.

7. A system according to claim 1, wherein the module for sorting of asbestos waste comprises:
    a workbench,
    a conveyor and
    a metal detection unit.

8. A system according to claim 1, that comprises a supply vehicle comprising:
    a means for the dismounting of a tank from the mobile neutralization unit containing the used acid bath,
    a means for the loading of a tank of pre-heated acid into the mobile neutralization unit,
    a means of emptying a tank of used water or the exchange of a tank of used water with an empty tank,
    a means of filling a tank with fresh water or its exchange with a tank of fresh water.

9. A system according to claim 1, that comprises a fixed supply unit comprising:
    a means of dismounting a tank from the mobile neutralization unit containing the bath of used acid,
    a means of loading a tank of pre-heated acid into the mobile neutralization unit,
    a means of emptying a tank of used water or its exchange with an empty tank,
    a means of filling a tank with fresh water or its exchange with a tank of fresh water and
    a means of transferring the functional data of the mobile neutralization unit from said unit to a secured database in the fixed unit.

10. A system according to claim 9, wherein the fixed supply unit comprises a microwave heating unit for the acid bath.

11. A system according to claim 9, that comprises a means for extraction of magnesium from the acid bath.

12. A system according to claim 9, that comprises a means of fabrication of zeolites from a solid fraction issued from the used acid bath.

13. A system according to claim 1, wherein the acid bath is comprised of sulfuric acid configured for producing Anhydrite from the solid products issued from the reaction taking place in the hot acid bath.

14. A system according to claim 1, wherein the acid is configured for formation of an inert solid including mesopores of which at least 10% have a diameter inferior to 20 Å.

15. A system according to claim 1, wherein the acid bath comprises sulfuric acid configured for producing magnesium sulfate from the solid products issued from the reaction taking place in the hot acid bath.

16. A process for neutralizing asbestos, that comprises:
    mounting on a boat a mobile housing including a module for sorting of asbestos waste having a window and a conveyor configured for transporting the asbestos in front of the window, said window is equipped with sealed glove boxes configured to allow manipulation of asbestos waste on the conveyor and remove non-asbestos from the conveyor;
    disposing a first chamber adjacent first end of said conveyor for introduction of asbestos waste;
    installing a grinder of asbestos adjacent a second end of the conveyor and being configured for grinding the asbestos waste from the conveyor
    detachably attaching an insulated bath of hot acid to said mobile housing said insulated bath having a sealed pipe configured for introducing ground asbestos from said asbestos grinder to said insulated bath;
    disposing a second chamber adjacent said conveyor for evacuating said non-asbestos;
    sorting of the asbestos waste on the conveyor; grinding of the asbestos by the grinder sealingly introducing ground asbestos from said asbestos grinder to said insulated bath such that the ground asbestos is rendered inert by the hot acid and, extracting magnesium from the liquid fraction in the hot acid and/or fabrication of zeolites from the solid fraction in the hot acid.

17. A process according to claim 16, wherein, the step of the sorting of asbestos waste, includes sorting of fibrocement waste.

* * * * *